E. E. BURNS.
TIRE GRIP.
APPLICATION FILED DEC. 4, 1909.
953,512.
Patented Mar. 29, 1910.
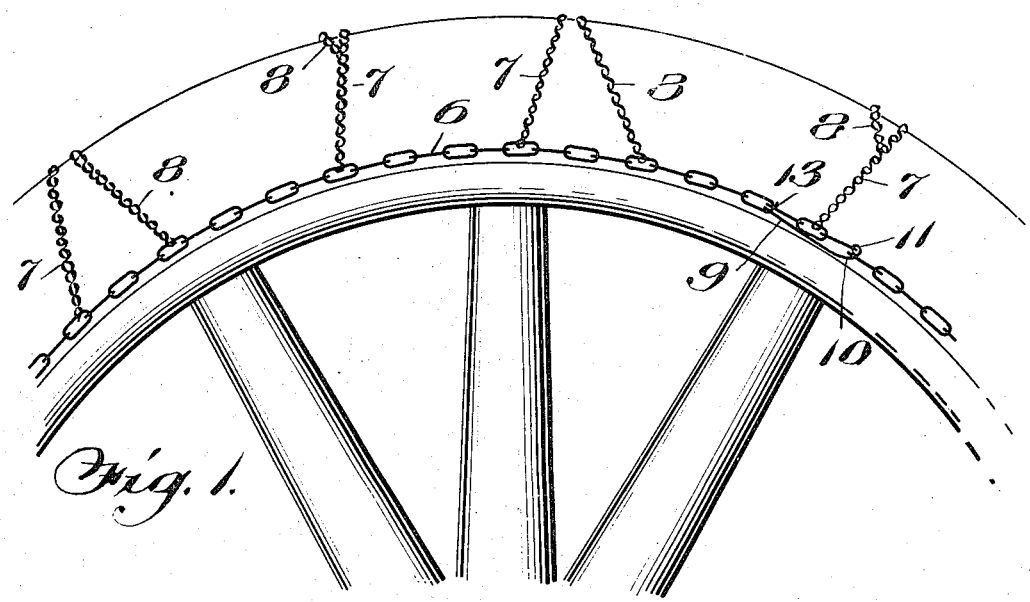
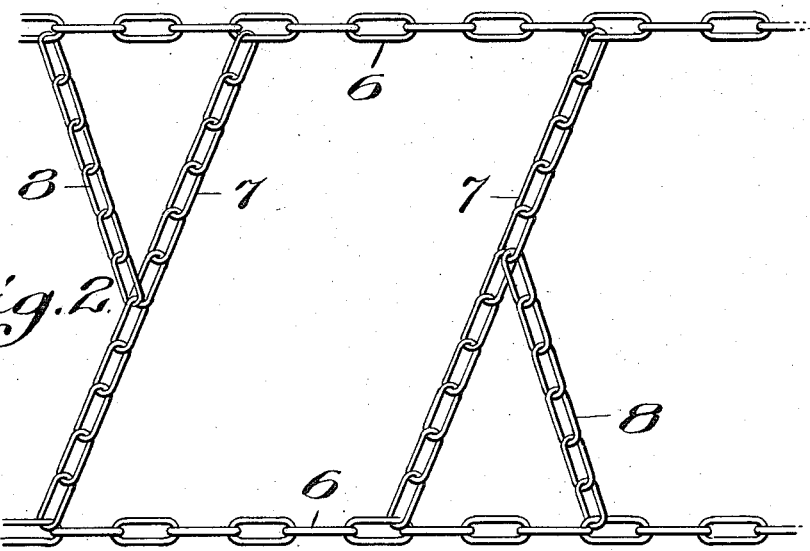
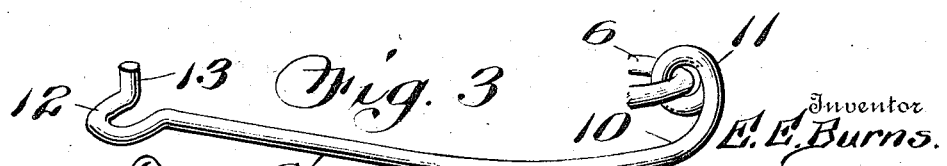

UNITED STATES PATENT OFFICE.

EUGENE E. BURNS, OF HARTLEY, IOWA.

TIRE-GRIP.

953,512.  Specification of Letters Patent.  Patented Mar. 29, 1910.

Application filed December 4, 1909. Serial No. 531,474.

*To all whom it may concern:*

Be it known that I, EUGENE E. BURNS, a citizen of the United States, residing at Hartley, in the county of O'Brien and State of Iowa, have invented certain new and useful Improvements in Tire-Grips, of which the following is a specification.

This invention relates to tire grips, and comprises particularly a chain grip for use on automobile wheels, its principal object being to provide a tire grip which will prevent skidding and which will enable the wheel to climb out of ditches and gutters, a characteristic feature being the provision of Y-shaped cross chains so arranged that two sections of the chain will be in contact with the ground at all times. This result is produced by making the junction of the branches of the Y at or about the tread line of the tire, whereby the chains forming the angle are both in contact with the ground, and both act to resist lateral or longitudinal slip of the wheel.

The invention is illustrated in the accompanying drawings in which—

Figure 1 is a side view of a part of an automobile wheel provided with the improved grip. Fig. 2 is a plan view of a part of the grip. Fig. 3 is a perspective view of the fastening device.

Referring specifically to the drawings, 6 indicates the longitudinal or side chains which extend around opposite sides of the rim as usual. The cross chains or chain sections consist of one piece of chain 7 which extends diagonally across between the side chains, and another chain section 8 which is located at an angle to the piece 7 and is joined at one end to one of the side chains and at the other end to a link in the chain 7, the junction with the latter being made slightly beyond the middle thereof, forming a substantially Y-shaped structure, with the fork of the Y located slightly to one side of the middle line of the tread, whereby the two chains forming the branches of the Y are in contact with the ground at the point on which the wheel rests. As shown in Fig. 2, the cross chains are oppositely arranged, in alternation with the stem or single part of the Y connected to the opposite side chains, whereby the angles of the Y are presented toward opposite sides alternately.

For connecting and fastening each of the side chains I use the device shown particularly in Fig. 3, consisting of a curved rod 9 bent inwardly at one end, as indicated at 10, toward the curved part of the rod, and terminating at the extremity in a loop 11 which is hooked through the last link at one end of the chain. At the opposite end of the fastener is a hook 12, offset laterally or sidewise from the rod, and at the end of this hook is a part 13 bent up to form a finger the purpose of which is to prevent disengagement of the hook from the link in which it is engaged.

In the use of the fastener the end with the hook 12 is slipped through the appropriate link at the end of the chain to be drawn up, and then it is swung back toward the other end of the chain, forming a lever to draw and take up the slack in the chain, the link slipping down along the rod 9 into the hook 10. Then, the free end of the fastener is inserted through one of the links in the chain 6, engaging said link in the hook 12, with the projecting finger 13 engaged beside the link, and in this position it acts to prevent the hook 12 slipping out of the link, even if the chain be made slack. To disengage the hook, it is necessary to turn or twist the fastener so that the finger 13 will slip through the link in reverse direction.

This fastener is simple and efficient, and permits all slack to be quickly taken up, and requires no tools for its manipulation. The connection and disconnection can be quickly performed, and pull on the chain has little or no tendency to disconnect the fastening. It can be engaged either with the end link of the chain or with any link near the end according to the looseness of the parts.

What I claim as new is:—

A tire grip comprising side chains, and cross chain members therebetween, each of said members comprising one piece of chain connected at its opposite ends to the side chains, and another piece connected at one end to one side chain and at the other end to said piece between its ends, and beyond the middle point thereof, whereby both pieces will contact with the ground at the middle line of the tire tread.

In testimony whereof, I affix my signature in presence of two witnesses.

EUGENE E. BURNS.

Witnesses:
 HARRY BRODERS,
 J. H. BORDEWIER.